(12) United States Patent
Kallo

(10) Patent No.: US 7,717,143 B2
(45) Date of Patent: May 18, 2010

(54) HEATED OUTLET VALVE FOR A HYDROGEN STORAGE TANK

(75) Inventor: Josef Kallo, Stuttgart (DE)

(73) Assignee: GM Global Technology Operations, Inc., Detroit, MI (US)

(*) Notice: Subject to any disclaimer, the term of this patent is extended or adjusted under 35 U.S.C. 154(b) by 923 days.

(21) Appl. No.: 11/470,749

(22) Filed: Sep. 7, 2006

(65) Prior Publication Data
US 2008/0060714 A1    Mar. 13, 2008

(51) Int. Cl.
*B65B 1/20* (2006.01)
*F16K 49/00* (2006.01)
*B67D 7/80* (2010.01)

(52) U.S. Cl. .............. 141/82; 141/11; 141/67; 141/301; 137/341; 222/146.2; 219/629

(58) Field of Classification Search ............ 141/11, 141/67, 69, 82, 98, 301, 302; 137/334, 341; 222/146.1, 146.2; 219/628, 629
See application file for complete search history.

(56) References Cited

U.S. PATENT DOCUMENTS

| | | | | |
|---|---|---|---|---|
| 3,144,174 A | * | 8/1964 | Abplanalp | 222/146.2 |
| 3,578,945 A | * | 5/1971 | Ayres et al. | 219/214 |
| 3,648,018 A | * | 3/1972 | Cheng et al. | 392/394 |
| 4,067,480 A | * | 1/1978 | Gasser | 222/146.3 |
| 4,624,189 A | * | 11/1986 | Loevinger | 105/451 |
| 5,169,031 A | * | 12/1992 | Miller | 222/146.5 |
| 6,796,123 B2 | | 9/2004 | Lasker | |
| 7,525,072 B2 | * | 4/2009 | Pechtold et al. | 219/550 |

FOREIGN PATENT DOCUMENTS

DE    88 10 276 U1    10/1988

\* cited by examiner

*Primary Examiner*—Timothy L Maust
(74) *Attorney, Agent, or Firm*—John A. Miller; Miller IP Group, PLC

(57) ABSTRACT

A compressed gas storage tank that has particular application for storing hydrogen for a fuel cell system. The compressed gas tank includes a cylindrical adapter and valve through which the hydrogen is removed from the tank. A low cost generator is positioned in the tank and has a rotating element positioned in a channel extending through the adapter. As hydrogen is removed from the tank, the mass flow of the hydrogen causes the rotating element to rotate which causes the generator to generate electricity. One or more resistive heating element are positioned in the adapter, preferably proximate to tank seals, that receive an electrical current from the generator that heats the resistive heating element and the adapter to increase the temperature of the adapter and the hydrogen being removed from the tank.

19 Claims, 1 Drawing Sheet

HEATED OUTLET VALVE FOR A HYDROGEN STORAGE TANK

BACKGROUND OF THE INVENTION

1. Field of the Invention

This invention relates generally to a compressed gas storage tank having a heated gas outlet channel and, more particularly, to a compressed gas storage tank that employs a low cost generator for generating electricity as a result of gas flow from the tank that is used to heat an electrical heater to heat the tank material proximate the tank sealings and the gas.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

Typically hydrogen is stored in a compressed gas tank under high pressure on the vehicle to provide the hydrogen necessary for the fuel cell system. The pressure in the compressed tank can be upwards of 700 bar. In one known design, the compressed tank includes an inner plastic liner that provides a gas tight seal for the hydrogen, and an outer carbon fiber composite layer that provides the structural integrity of the tank. At least one pressure regulator is typically provided that reduces the pressure of the hydrogen within the tank to a pressure suitable for the fuel cell system.

It is important that the compressed hydrogen stored in the tank be prevented from leaking or diffusing out of the tank. Because hydrogen is a very light and diffusive gas, sealing the tank is typically difficult, especially around the connection area to the outside of the tank. Thus, it is desirable to reduce the number of sealings and the complexity of the connection area to the tank. Also, typically the connecting structures in the tank are made of different materials, which also make the sealing more difficult.

As the hydrogen is removed from the compressed tank, the pressure of the hydrogen decreases. When the pressure of a gas is reduced and the volume does not change, the temperature of the gas will also decrease. If the flow rate of the hydrogen flowing out of the tank is high enough and/or the temperature of the environment is low enough, the temperature in the tank can fall below $-80°$ C. Typically it is possible to limit the hydrogen flow rate so that $-80°$ C. is the lowest temperature that occurs within the tank. If the temperature of the hydrogen within the tank decreases beyond a certain temperature, such as $-80°$ C. around the liner and $-40°$ C. at the tank seals, including O-rings and other sealings, the materials become brittle and possibly damaged, affecting the tank's gas tight performance. Therefore, there are generally limits as to how fast hydrogen and/or for how long hydrogen can be removed from the compressed tank in a fuel cell system. However, this could be undesirable because the output current of the fuel cell stack could be limited accordingly.

It is known to heat the connector area of the tank with an electrical heating element or hot water so that the temperature of the O-rings and other components are maintained above a desirable temperature. However, the known heating solutions are typically complex and costly because the entire connector area is heated, which requires a substantial amount of energy.

Also, it has been proposed in the art to increase the integrity of the various sealings that seal the opening of the compressed gas storage tank. However, as the hydrogen is removed from the tank over a number of cycles, the sealing integrity of the seals may be reduced. Further, providing reinforced seals and the like adds a significant cost to the tank.

SUMMARY OF THE INVENTION

In accordance with the teachings of the present invention, a compressed gas storage tank is disclosed that has particular application for storing hydrogen for a fuel cell system. The compressed gas tank includes a cylindrical adapter and valve through which the hydrogen is removed from the tank. A low cost generator is positioned in the tank and has a rotating element positioned in a channel extending through the adapter. As hydrogen is removed from the tank, the mass flow of the hydrogen causes the rotating element to rotate which causes the generator to generate electricity. One or more resistive heating elements are positioned in the adapter, preferably proximate to tank seals, that receive an electrical current from the generator that heats the resistive heating element and the adapter to increase the temperature of the adapter and the hydrogen being removed from the tank.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a technique for heating hydrogen flowing from a compressed gas storage tank is merely exemplary in nature, and is in no way intended to limit the invention or its applications or uses. Particularly, the compressed gas storage tank of the invention has particular application for storing compressed hydrogen for a fuel cell system. However, as will be appreciated by those skilled in the art, the compressed gas storage tank of the present invention will have application for other systems.

Figure 1:
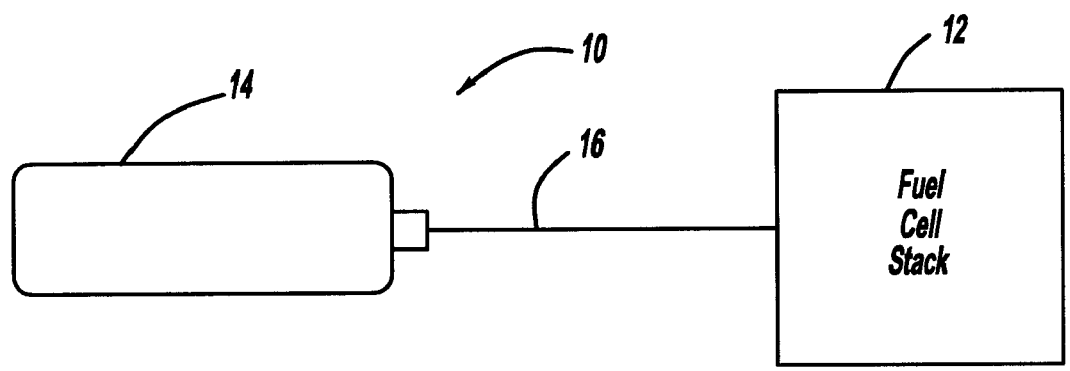
FIG. 1 is a general plan view of a fuel cell system including a compressed hydrogen storage tank and a fuel cell stack.

FIG. 1 is a plan view of a fuel cell system 10 including a fuel cell stack 12 and a compressed hydrogen storage tank 14 of the type discussed above. Hydrogen gas from the tank 14 flows to the anode side of the fuel cell stack on hydrogen supply line 16. Hydrogen is selectively removed from the tank 14 during operation of the fuel cell system 10 to provide the hydrogen fuel for the stack 12 in a controlled manner through various valves, pressure regulators, etc. (not shown) as is well understood to those skilled in the art.

Figure 2:
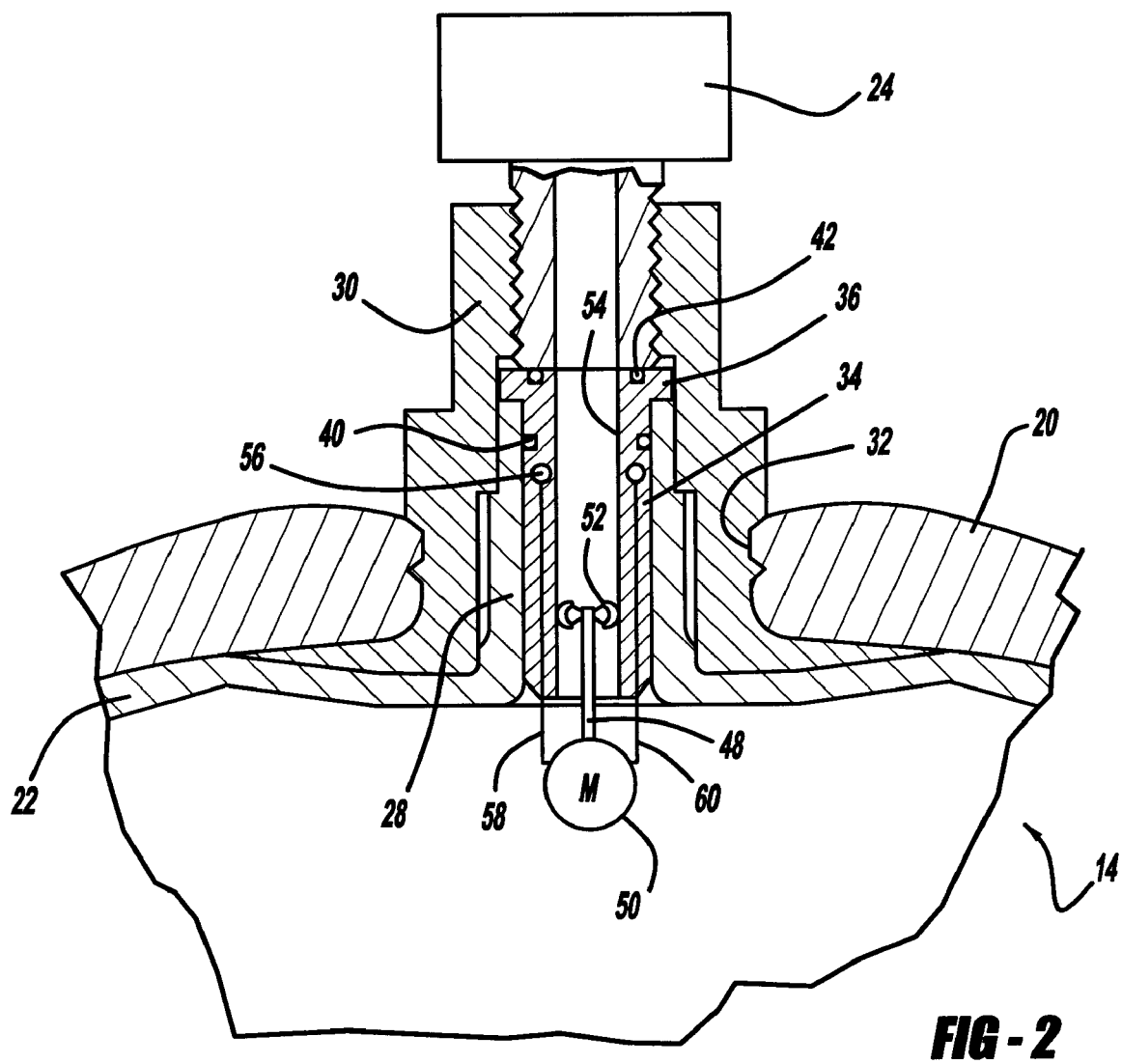
FIG. 2 is a broken-away, cross-sectional view of the outlet portion of the compressed hydrogen storage tank shown in FIG. 1, and including a generator for providing electricity to a heating element, according to an embodiment of the present invention.

FIG. 2 is a cut-away, cross-sectional view of the storage tank 14 that includes an outer structural layer 20 typically made of a graphite composite and an inner liner 22, typically made of a durable plastic, such as a high density polyethylene. The liner 22 provides the gas type environment for the hydrogen, and the outer layer 20 provides structural integrity for the compressed hydrogen gas.

A metal boss 30, typically stainless steel, is provided between an opening 32 in the outer layer 12 and a neck portion 28 of the liner 14. An adapter 34 is mounted in the neck portion 28 of the liner 14 where a flange 36 of the adapter 34 abuts against an end of the neck portion 28, as shown. The adapter 34 is fitted in the tank 14 and remains in place. A connector 24 is threaded into an outer end of the boss 30 to be positioned against the flange 36. The connector 24 may also extend through the adapter 34 into the liner 22. The connector 24 may contain certain components, such as valves and sensors. The boss 30 is configured to be securely held between the outer layer 20 and the liner 22, to securely hold the adapter 34 to the neck portion 28, and to securely hold the connector 24 within the boss 30.

An O-ring 40 provides a seal between the neck portion 28 of the liner 22 and the adapter 34. Additionally, an O-ring 42 provides a seal between the flange 36 and end of the connector 24, as shown. The O-rings 40 and 42 help provide the sealing between the various elements of the connection area of the tank 14. The details of the tank 14 discussed above are merely meant to be representative in that many other tank designs are know in the art for storing compressed hydrogen gas.

According to the invention, the tank 14 also includes a generator 50 having a rotating element 52 coupled thereto by a shaft 48 and positioned within a channel 54 extending through the adapter 34 through which the compressed gas flows from the tank 14. In one embodiment, the generator 50 is an inexpensive and simple screw-type machine that provides a relatively slow rotation of the rotating element 52 as the gas travels through the channel 54. As the rotating element 52 rotates, the generator 50 generates electricity that is transferred to a ring heating element 56 positioned within the adapter 34 on electrical lines 58 and 60. The ring heating element 56 heats the adapter 34, which heats the O-rings 40 and 42 and the hydrogen flowing through the channel 54.

The heating element 56 can be any resistive heating element suitable for the purposes described herein. Further, the diameter of the heating element 56 can be any suitable diameter for the dimensions of the adapter 34 and the desired amount of heating. Further, more than one heating element can be provided.

In one specific embodiment, the generator 50 includes a valve transducer positioned within the walls of the adapter 34 that connects the generator stator and a load screw with a rotor cage. The generator 50 and the rotating element 52 are made of suitable metal to withstand the pressures within the tank 14. Further, because these components are within the tank 14, they do not present a leakage problem. Also, the heat energy from the heating element 56 is distributed throughout the gas volume remaining within the tank 14.

The electrical current generated by the generator 50 is proportional to the amount of hydrogen that flows through the channel 54, and thus, the system is self-regulating and overheating will not occur. Particularly, as the flow of hydrogen through the channel 54 increases in response to higher load demands from the fuel cell stack 12, the temperature of the hydrogen being emitted from the tank 14 will go down. Further, the rotating element 52 will increase in speed from the higher mass flow rate of the hydrogen, which will generate more electricity by the generator 50 which will cause the heating element 56 to provide more heat, which will further increase the temperature of the adapter 34 and the hydrogen accordingly. Further, because of the self-regulation, no electronics are required within the tank 14 to provide control and regulation of the generator 50. Thus, all the components associated with the heating of the adapter 34 are metal components that will not compress under the pressure within the tank 14. The generator 50 can be either a DC machine or an AC machine.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A compressed gas tank assembly comprising:
   an outer wall system for containing the compressed gas, said wall system including an opening;
   a cylindrical structure positioned within the opening and including an inner channel through which the gas flows;
   at least one heating element; and
   a generator device positioned within the wall system and being electrically coupled to the at least one heating element, said generator device including a rotating element positioned within the inner channel and rotating in response to gas flow therethrough, wherein as the rotating element rotates, the generator device generates an electrical current that heats the at least one heating element.

2. The tank assembly according to claim 1 wherein the generator device is a screw-type machine.

3. The tank assembly according to claim 1 wherein the at least one heating element is a resistive element.

4. The tank assembly according to claim 1 wherein the at least one heating element is positioned within the cylindrical structure.

5. The tank assembly according to claim 4 wherein the at least one heating element is a resistive ring element.

6. The tank assembly according to claim 1 wherein the tank assembly contains compressed hydrogen.

7. The tank assembly according to claim 1 wherein the wall system includes an outer structural wall and an inner plastic liner.

8. The tank assembly according to claim 1 further comprising at least one sealing ring, said at least one heating element being positioned proximate the sealing ring.

9. The tank assembly according to claim 1 wherein the tank assembly is part of a fuel cell system.

10. A compressed gas tank assembly comprising:
    an outer wall system for containing the compressed gas, said wall system including an opening;
    a cylindrical adapter positioned in the opening of the wall assembly and including an inner channel through which the gas flows, said adapter including at least one heating element;
    at least one seal being positioned proximate to or in contact with the adapter and the wall system; and
    a generator device positioned within the wall system, said generator device being electrically coupled to the at least one heating element, said generator device including a rotating element positioned within the inner channel and rotating in response to gas flow therethrough, wherein as the rotating element rotates, the generator device generates electricity that is transferred to the at least one heating element to heat the adapter and the gas being emitted from the tank assembly through the inner channel.

11. The tank assembly according to claim 10 wherein the generator device is a screw-type machine.

12. The tank assembly according to claim 10 wherein the at least one heating element is a resistive element.

13. The tank assembly according to claim 10 wherein the at least one heating element is a resistive ring element within the adapter.

14. The tank assembly according to claim 10 wherein the tank assembly contains compressed hydrogen.

15. The tank assembly according to claim 10 wherein the wall system includes an outer structural wall and an inner plastic liner.

16. The tank assembly according to claim 1 wherein the tank assembly is part of a fuel cell system.

17. A compressed hydrogen storage tank for a fuel cell system, said tank comprising:

an outer wall for containing the compressed hydrogen, said outer wall including an opening;

a cylindrical adapter positioned within the opening of the outer wall and including an inner channel through which the hydrogen flows, said adapter including at least one resistive ring heating element;

at least one seal being positioned proximate to or in contact with the adapter and the outer wall; and a generator device positioned within the outer wall and being electrically coupled to the at least one heating element, said generator device including a rotating element positioned within the inner channel and rotating in response to hydrogen flow therethrough, wherein as the rotating element rotates, the generator device generates electricity that is transferred to the at least one heating element to heat the adapter and the hydrogen being emitted from the tank through the inner channel.

18. The tank according to claim 17 wherein the generator device is a screw-type machine.

19. The tank according to claim 17 further comprising an inner plastic line positioned adjacent to the outer wall.

* * * * *